United States Patent
Cen et al.

(10) Patent No.: US 12,209,354 B2
(45) Date of Patent: Jan. 28, 2025

(54) CONTINUOUS POLYESTER FIBER TEXTILE CLOTH, PROCESSING EQUIPMENT AND METHOD

(71) Applicant: Ningbo Xinrun Textile Co., Ltd., Ningbo (CN)

(72) Inventors: Buyi Cen, Ningbo (CN); Jieyuan Cen, Ningbo (CN); Lijun Lin, Ningbo (CN); Chenxin Fei, Ningbo (CN); Robert Poirier, Southborough, MA (US)

(73) Assignee: Ningbo Xinrun Textile Co., Ltd., Ningbo (CN)

( * ) Notice: Subject to any disclaimer, the term of this patent is extended or adjusted under 35 U.S.C. 154(b) by 195 days.

(21) Appl. No.: 17/857,452

(22) Filed: Jul. 5, 2022

(65) Prior Publication Data
US 2023/0304214 A1    Sep. 28, 2023

(30) Foreign Application Priority Data
Mar. 24, 2022   (CN) .......................... 202210301190.5

(51) Int. Cl.
*D06H 7/22* (2006.01)
*A47K 10/16* (2006.01)
(Continued)

(52) U.S. Cl.
CPC ............. *D06H 7/223* (2013.01); *A47K 10/16* (2013.01); *B32B 3/30* (2013.01); *B32B 5/024* (2013.01); *B32B 5/026* (2013.01); *B32B 5/26* (2013.01); *B32B 5/263* (2021.05); *B32B 5/2795* (2021.05); *B32B 38/0008* (2013.01); *B32B 38/0012* (2013.01); *D03D 27/08* (2013.01);
(Continued)

(58) Field of Classification Search
CPC ............. D06H 7/223; B32B 2307/582; B32B 2432/00; B32B 2310/028; D03D 27/08; A47K 10/16
See application file for complete search history.

(56) References Cited

U.S. PATENT DOCUMENTS 6,120,629 A * 9/2000 Shannon ................. B29C 66/45
156/580.2
2014/0057069 A1* 2/2014 Huang ................... A47K 10/42
428/126

(Continued)

OTHER PUBLICATIONS

What is Knit Fabric?, Jan. 17, 2021, pinecrestfabrics, https://pinecrestfabrics.com/fabric-knowledge/knit-fabric/ (Year: 2021).*

*Primary Examiner* — Jasper Saberi
(74) *Attorney, Agent, or Firm* — Birchwood IP

(57) ABSTRACT

The invention discloses a continuous polyester fiber textile cloth that can be torn into pieces, processing equipment and a processing method. By ultrasonic hot-melting technology, the polyester fiber textile cloth is subjected to the high temperature generated by the high frequency generated by the action of a metal knife mold and an ultrasonic welding head, so that the thread of the loop layers and the base layer are melted in a line to form a thin line melting body that can be torn apart. The knife mold and the ultrasonic welding head are close to each other and resonate to generate heat. When they leave each other, the resonance disappears and the heat decreases, so as to realize the formation and temperature control of a linear high temperature zone.

10 Claims, 3 Drawing Sheets

(51) Int. Cl.

|  |  |
|---|---|
| *B32B 3/30* | (2006.01) |
| *B32B 5/02* | (2006.01) |
| *B32B 5/26* | (2006.01) |
| *B32B 38/00* | (2006.01) |
| *D03D 27/08* | (2006.01) |
| *D04B 1/16* | (2006.01) |
| *D04B 21/00* | (2006.01) |
| *D06H 7/00* | (2006.01) |
| *D06H 7/02* | (2006.01) |

(52) U.S. Cl.
 CPC ............... *D04B 1/16* (2013.01); *D04B 21/00* (2013.01); *D06H 7/005* (2013.01); *D06H 7/02* (2013.01); *B32B 2250/20* (2013.01); *B32B 2262/0276* (2013.01); *B32B 2305/186* (2013.01); *B32B 2305/188* (2013.01); *B32B 2307/582* (2013.01); *B32B 2307/732* (2013.01); *B32B 2310/028* (2013.01); *B32B 2367/00* (2013.01); *B32B 2432/00* (2013.01); *D10B 2331/04* (2013.01); *D10B 2503/00* (2013.01)

(56) References Cited

U.S. PATENT DOCUMENTS

2020/0040491 A1\* 2/2020 Mittal .................... D03D 15/47
2020/0054156 A1\* 2/2020 Chang ................ A47G 23/0303

\* cited by examiner

CONTINUOUS POLYESTER FIBER TEXTILE CLOTH, PROCESSING EQUIPMENT AND METHOD

CROSS-REFERENCE TO RELATED APPLICATIONS

This application claims the benefit and priority of Chinese patent application No. 202210301190.5, filed on Mar. 24, 2022, disclosure of which is hereby incorporated by reference in its entirety.

TECHNICAL FIELD

The invention relates to a textile cloth, in particular to a polyester fiber textile cloth that can be torn into pieces. The continuous polyester fiber textile cloth is provided with thin line melting bodies at intervals, and after tearing along the thin line melting body, a single piece of textile cloth can be separated from the continuous polyester fiber textile cloth.

BACKGROUND

Polyester fiber textile cloth are mainly used for towel cloth, wiping cloth, floor washing cloth, etc.

Polyester fibers include pure polyester and mixed polyester. Mixed polyester is: the proportion of single yarn is 2 kinds, one is: 80% polyester, 20% nylon, the other is: 85% polyester, 15% nylon.

The composition ratio of the textile cloth:the middle base layer is 32-30% polyester material, and the loop layer on both sides accounts for 68-70% mixed polyester yarn.

Polyester yarn and polyester nylon yarn are woven into grey fabric by warp knitting or weft knitting. The fabric formed by dyeing and splitting comprises a base layer in the middle and loop layers on both sides.

When producing textile cloth, because chemical fiber cloth is not easy to tear, the continuous polyester fiber textile cloth is first cut into sheet-like textile cloth, which is formed into towel cloth, wiping cloth or floor washing cloth, and then these textile cloths are stacked together for packaging.

For manufacturing enterprises, the above-mentioned production and packaging methods have many process steps and high production costs; at the same time, it is not convenient enough for users to use.

SUMMARY OF THE APPLICATION

In view of the inconvenience of the above-mentioned sheet textile cloths in production, packaging and use by users, the present invention provides a continuous polyester fiber textile cloth that can be torn into pieces, and a processing equipment and method for preparation of the continuous polyester fiber textile cloth that can be torn into pieces.

The technical solution adopted by the present invention to solve the above technical problems is: a continuous polyester fiber textile cloth that can be torn into pieces, comprising a continuously extending polyester fiber textile cloth, wherein the polyester fiber textile cloth is provided with a plurality of thin line melting bodies at certain intervals along the length direction, and the thin line melting body is configured to span the width of the polyester fiber textile cloth;

the polyester fiber textile cloth comprises a base layer woven from yarn and a loop layer arranged on at least one side of the base layer, and the thin line melting bodies are formed by heating, melting and pressing the base layer and the loop layer, the thickness of the thin line melting bodies is less than or equal to the thickness of the base layer; and by tearing along the thin line melting body, a single piece of textile cloth can be separated from the continuous polyester fiber textile cloth.

The preferred technical solution adopted by the present invention to solve the above-mentioned technical problems is: the thin line melting body is configured to be in the form of a straight line, a curved line, a zigzag line or a bent line.

The preferred technical solution adopted by the present invention to solve the above-mentioned technical problems is: the thickness of the thin line bodies is 0.01-2 mm, and the width of the thin line melting bodies is 1-5 mm.

The preferred technical solution adopted by the present invention to solve the above-mentioned technical problems is: the width of the single piece of textile cloth is consistent with the width of the polyester fiber textile cloth and the length of the single piece of textile cloth is 5 cm-200 cm.

The preferred technical solution adopted by the present invention to solve the above-mentioned technical problems is: the two sides of the polyester fiber textile cloth are heat-melt cutting edges.

The preferred technical solution adopted by the present invention to solve the above-mentioned technical problems is: the two sides of the base layer are respectively provided with loop layers, and the base layer and the two loop layers are heated and melted and pressed to form the thin line melting body.

The preferred technical solution adopted by the present invention to solve the above-mentioned technical problems is: the base layer and the loop layers are heated and melted by high-frequency ultrasonic waves.

The preferred technical solution adopted by the present invention to solve the above-mentioned technical problems is: it comprises an inner core, and the polyester fiber textile cloth with the thin line melting bodies is wound on the inner core.

The preferred technical solution adopted by the present invention to solve the above-mentioned technical problems is: the polyester fiber textile cloth with thin line melting bodies is stacked in a container in a "Z"-shaped continuous folding manner.

The preferred technical solution adopted by the present invention to solve the above-mentioned technical problems is: the base layer is prepared by a warp knitting process, the base layer comprises loop units composed of woven threads, and the loop units are mutually interwoven to form constraints.

The preferred technical solution adopted by the present invention to solve the above-mentioned technical problems is: the base layer is prepared by a weft knitting process, and the base layer comprises a semi-loop unit composed of woven threads, and the semi-loop units formed by adjacent woven threads are mutually interwoven.

The preferred technical solution adopted by the present invention to solve the above-mentioned technical problems is: a processing equipment for continuous polyester fiber textile cloth that can be torn into pieces, comprising an ultrasonic welding head and a metal knife mold driven by a driving mechanism, and the metal knife mold comprises a knife edge extending along the width direction of the textile cloth;

the knife edge is configured to act on an upper surface of the polyester fiber textile cloth, and the ultrasonic welding head is configured to act on a lower surface of the polyester fiber textile cloth;

under the action of the driving mechanism, the knife edge of the metal knife mold is pressed down through the polyester fiber textile cloth to contact the ultrasonic welding head to resonate, and the ultrasonic welding head produces a linear high temperature zone;

the base layer and the loop layers of the polyester fiber textile cloth are melted under the action of the linear high temperature zone, and a thin line melting body is formed under the extrusion of the metal knife mold and the ultrasonic welding head.

The preferred technical solution adopted by the present invention to solve the above-mentioned technical problems is: a vibration frequency of the ultrasonic welding head is 2000-50000 times/second, and a heating temperature of the ultrasonic welding head is 150-400° C.

The preferred technical solution adopted by the present invention to solve the above-mentioned technical problems is: the duration for the knife edge to press down and contact the polyester fiber textile cloth is 0.02-1 second.

The preferred technical solution adopted by the present invention to solve the above-mentioned technical problems is: a method for processing the continuous polyester fiber textile cloth that can be torn into pieces:

wherein passing the continuous polyester fiber textile cloth through an ultrasonic equipment, and base layer and loop layers of the continuous polyester fiber textile cloth are melted by the high temperature generated by the ultrasonic equipment and pressed to form thin line melting bodies, which can be used to separate a single piece of textile cloth.

The preferred technical solution adopted by the present invention to solve the above-mentioned technical problems is: the ultrasonic equipment comprises an ultrasonic welding head and a metal knife mold driven by a driving mechanism, the metal knife mold comprises knife edge extending along the width direction of the textile cloth;

the knife edge is configured to act on an upper surface of the polyester fiber textile cloth, and the ultrasonic welding head is configured to act on a lower surface of the polyester fiber textile cloth;

under the action of the driving mechanism, the knife edge of the metal knife mold is pressed down through the polyester fiber textile cloth to contact the ultrasonic welding head to resonate, and the ultrasonic welding head produces a linear high temperature zone;

the base layer and the loop layers of the polyester fiber textile cloth are melted under the action of the linear high temperature zone, and a thin line melting body is formed under the extrusion of the metal knife mold and the ultrasonic welding head.

The preferred technical solution adopted by the present invention to solve the above-mentioned technical problems is: a vibration frequency of the ultrasonic welding head is 2000-50000 times/second, and a heating temperature of the ultrasonic welding head is 150-400° C.

The preferred technical solution adopted by the present invention to solve the above-mentioned technical problems is: the duration for the knife edge to press down and contact the polyester fiber textile cloth is 0.02-1 second.

The preferred technical solution adopted by the present invention to solve the above-mentioned technical problems is: the method comprises the following steps:
(1) the drive mechanism drives the metal knife mold to press down, and the ultrasonic welding head vibrates at high frequency;
(2) the metal knife mold and the ultrasonic welding head extrude the polyester fiber textile cloth and keep it for a certain period of time;
(3) remove the ultrasonic emission, the drive mechanism drives the metal knife to rise, and a thin line melting body is prepared;
(4) the steps (1)-(3) are continued after a certain period of time to complete the preparation of the next thin line melting body.

The preferred technical solution adopted by the present invention to solve the above-mentioned technical problems is: the operation of the driving mechanism and the ultrasonic emission of the ultrasonic welding head are controlled by a control signal to realize linkage.

Compared with the prior art, the advantage of the present invention is that an ultrasonic hot-melting technology is adopted. By ultrasonic hot-melting technology, the polyester fiber textile cloth is subjected to the high temperature generated by the high frequency generated by the action of a metal knife mold and an ultrasonic welding head, so that the thread of the loop layers and the base layer are melted in a line to form a thin line melting body that can be torn apart. So as to achieve the effect of melting but not breaking, and breaking as soon as it is torn;

Using this ultrasonic resonance method, there is no need to preheat the ultrasonic welding head or the metal knife mold during preparation. The knife mold and the ultrasonic welding head are close to each other and resonate to generate heat. When they leave each other, the resonance disappears and the heat decreases, so as to realize the formation and temperature control of a linear high temperature zone. Therefore, continuous operation can be achieved, and the temperature of each cutter head is basically consistent, ensuring the consistency of the melt of each thin line.

BRIEF DESCRIPTION OF THE DRAWINGS

The present invention will be described in further detail below with reference to the accompanying drawings and preferred embodiments. However, those skilled in the art will appreciate that these drawings are drawn for purposes of explaining preferred embodiments only and should therefore not be taken as limiting the scope of the invention. Unless otherwise indicated, the drawings are merely schematic representations of the composition or construction of the described objects and may contain exaggerated representations and are not necessarily drawn to scale.

DETAILED DESCRIPTION

Preferred embodiments of the present invention will be described in detail below with reference to the accompanying drawings. Those skilled in the art will appreciate that these descriptions are descriptive, exemplary only, and should not be construed as limiting the scope of protection of the present invention.

It should be noted that like numerals refer to like items in the following figures, so once an item is defined in one figure, it may not be further defined and explained in subsequent figures.

In the description of the present invention, it should be noted that the orientation or positional relationship indicated by the terms "front", "rear", etc. is based on the orientation or positional relationship shown in the accompanying drawings, or is usually placed when the product of the invention is used. The orientation or positional relationship is only for the convenience of describing the present invention and simplifying the description, rather than indicating or implying that the referred device or element must have a specific orientation, be constructed and operated in a specific orientation, and therefore should not be construed as a limitation of the present invention.

Figure 1:
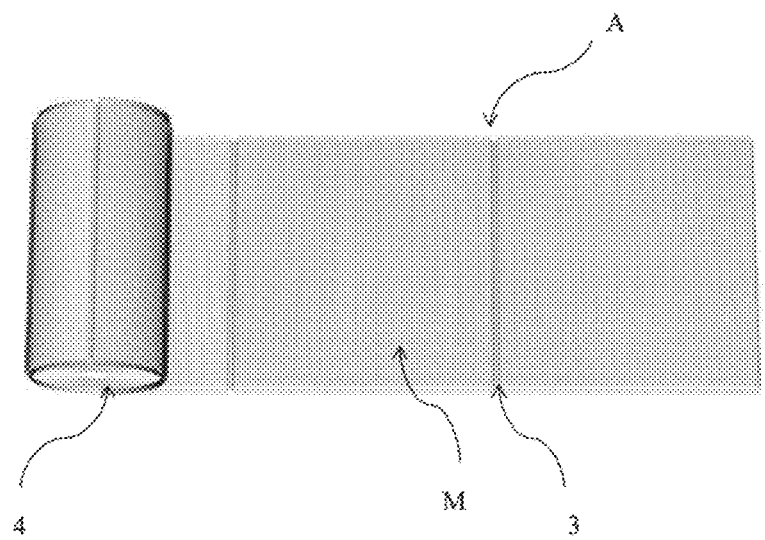
FIG. 1 is the schematic diagram of the continuous polyester fiber textile cloth that can be torn into pieces by winding.
Figure 2:
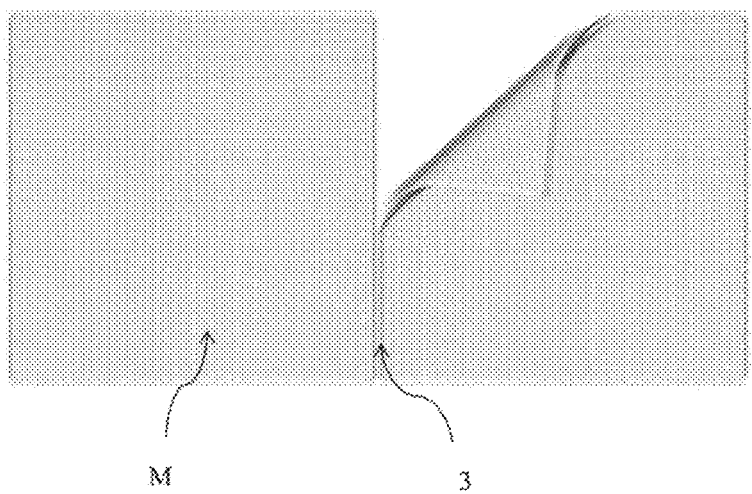
FIG. 2 is a schematic diagram of the tearing process of the continuous polyester fiber textile cloth that can be torn into pieces.
Figure 3:
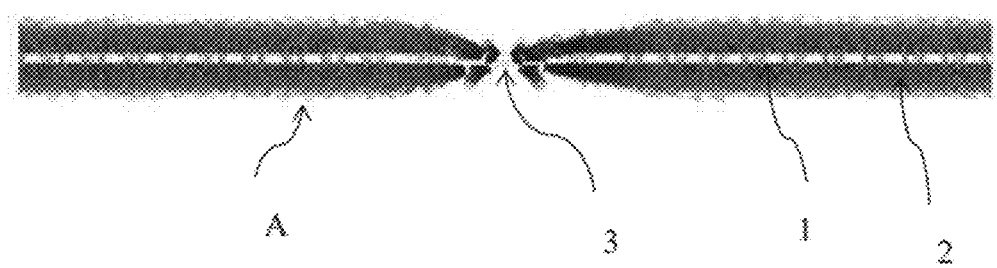
FIG. 3 is a partial cross-sectional view of the continuous polyester fiber textile cloth that can be torn into pieces.

As shown in FIGS. 1-3, the continuous polyester fiber textile cloth that can be torn into pieces comprises a continuously extending polyester fiber textile cloth A. The polyester fiber textile cloth A consists of a base layer 1 woven from yarns and loop layer 2 arranged on at least one side of the base layer 1.

Figure 4:
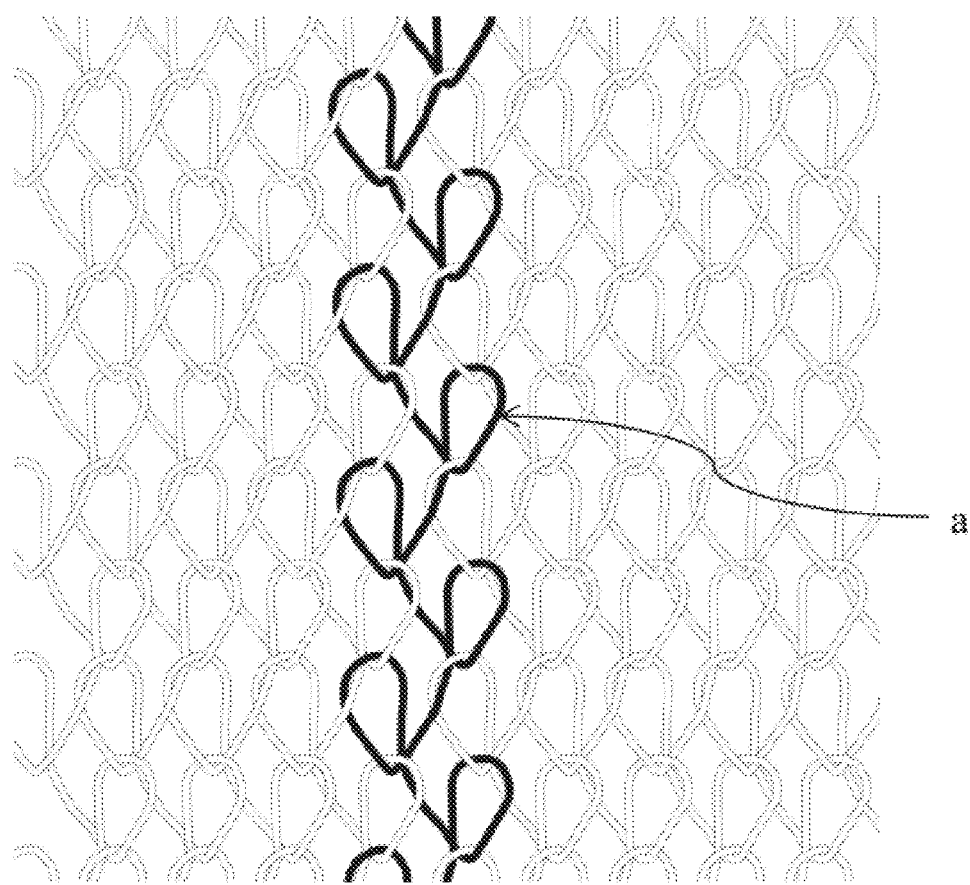
FIG. 4 is a diagram of the base layer woven by a warp knitting process of a continuous polyester fiber textile cloth that can be torn into pieces.
Figure 5:
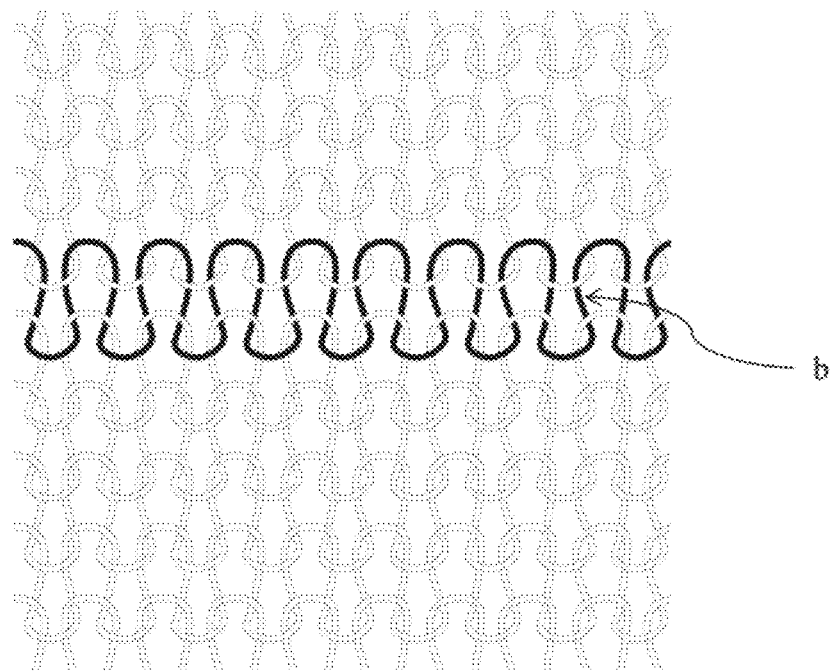
FIG. 5 is a diagram of the base layer woven by a weft knitting process of the continuous polyester fiber textile cloth that can be torn into pieces.

As shown in FIG. 4, the base layer 1 is prepared by a warp knitting process; as shown in FIG. 5, the base layer 1 is prepared by a weft knitting process. The base layer 1 prepared by the above two processes has a loop unit a or a semi-loop unit b composed of woven threads.

The loop units a on the warp lines of the base layer prepared by the warp knitting process are interlocked, and a lead wire of the loop units a on the weft lines passes through the loop units a on the adjacent weft lines. Another lead wire is used to surround the annular unit a forming a diagonal position, so that the adjacent annular units a are intertwined to form a constraint.

The woven threads of the base layer prepared by the weft knitting process are bent in a wave shape to form adjacent semi-loop units b spaced in forward and reverse directions on the weft. The semi-loop units b formed by adjacent weft threads are intertwined with each other.

The interwoven loop units a or semi-loop units b provide the entire base layer 1 with tear resistance, thereby making the polyester fiber textile cloth more durable.

The loop knitting units of the loop layer 2 protrude from the surface of the base layer 1 and are arranged on the surface of the base layer 1 in a matrix manner. Each loop knitting unit is further interwoven with the loop unit a or semi-loop unit b of the base layer 1, so that the base layer 1 and the loop layer 2 are combined, which improves the water absorption and cleaning ability of the polyester fiber textile cloth and also improves the strength of the textile cloth.

As shown in FIGS. 1-3, the continuous polyester fiber textile cloth is provided with a plurality of thin line melting bodies 3 at intervals along the length direction.

The thin line melting bodies 3 can span the width of the polyester fiber textile cloth, or can be interlaced to form a grid, so as to separate the long polyester fiber textile cloth to form several textile cloth units M.

These thin line melting bodies 3 are formed by heating, melting and pressing the base layer 1 and the loop layers 2, and the thickness of the thin line melting bodies 3 are less than or equal to the thickness of the base layer 1. The thin line melting bodies 3 are concave on the surface of the polyester fiber textile cloth, and its position can be known visually.

It should be understood that, through hot-melt pressing, firstly, the toughness of the fibers itself at the thin line melting bodies 3 are thermally damaged and becomes brittle; secondly, the constraints between the loop units a of the base layer 1 and the constraints between the loop knitting unit and the loop units a of the base layer 1 at this place are both damaged; thirdly, the thin line melting bodies 3 at this place are concave to make the stress more concentrated to form a tearing notch. That is, the thin line melting bodies 3 are easily broken by force.

Accordingly, the user can tear along the thin line melting body 3 to separate out a single piece of textile cloth. Depending on the amount of objects to be cleaned, the size and length of the cloth can be determined by tearing it off without cutting it with a knife or a sharp blade.

Preferably, the thin line melting body 3 can be in the form of a straight line, a curved line, a zigzag line or a bent line. In this embodiment, the thin line melting bodies 3 run through the width of the polyester fiber textile cloth and are distributed on the long polyester fiber textile cloth at certain intervals, thereby separating the polyester fiber textile cloth into textile cloth units M with the same size, which is of convenience for users.

Preferably, the material of the base layer 1 is all polyester, and the material of the loop layer 2 is mixed polyester formed of polyester and nylon. Among them, the base layer 1 accounts for 30-32%, and the loop layer 2 accounts for 68-70%.

As shown, the matrix arrangement of the loop knitting units of the terry layer 2 will form longitudinal terry spacing lines, and the thin strand melt 3 is parallel to the longitudinal terry spacing lines. The loop knitting units on both sides of the thin line melting bodies 3 melt and shrink and form lodging, so that the loop layers 2 on both sides of the thin line melting bodies 3 gradually changes from thin to thick from the thin line melting body 3.

As shown in FIGS. 1-3, the textile cloth unit M spaced apart by the longitudinal thin line melts 3 is separated from the integral continuous polyester fiber textile cloth to form a single piece of textile cloth. The width of the single piece of textile cloth is the same as the width of the long polyester fiber textile cloth, and the length of the single piece of textile cloth is 5 cm-200 cm.

Preferably, the two sides of the base layer 1 are respectively provided with loop layers 2, and the base layer 1 and the two loop layers 2 are heated and melted and then pressed to form a thin line melting body 3. The thin line melting body 3 is located at the midline of the thickness of the polyester fiber textile cloth to form concave wire grooves on both surfaces of the polyester fiber textile cloth.

As shown in the figure, the thin line melting body 3 has a thickness of 0.01-2 mm and a width of 1-5 mm. With a thickness of 0.01-2 mm, the thin line melting body 3 has the ability to connect the textile cloth units M on both sides without external force tearing, so that the polyester fiber woven fabric maintains continuity. This in turn ensures that the connection strength is within a range that can be broken after being torn by the user, which is convenient for the user to tear and separate the textile cloth into a single piece. At the same time, the width of the thin line melting body 3 also affects its connection strength. In addition, the width range of 1-5 mm makes the thin line melting body 3 visible without wasting cloth.

In addition, both sides of the continuous polyester fiber textile cloth are bound off by heat-melting cutting edges, which can prevent the textile cloth from running silk. After any thin line melting bodies 3 on the continuous polyester fiber textile cloth is torn and separated from the textile cloth unit M, a part of the thin line melting body 3 remains on the outer edge of the remaining continuous polyester fiber textile cloth, which still plays the role of binding off.

In order to facilitate the storage and taking of the continuous polyester fiber textile cloth, this embodiment provides a placement form of the continuous polyester fiber textile cloth, that is, a roll-type polyester fiber textile cloth. Of course, other placement forms such as a folding and pulling type are also possible.

As shown in FIG. 1, the roll-type polyester fiber textile cloth comprises an inner core 4 and the polyester fiber textile cloth A with the thin line melting bodies 3 wound outside the inner core 4, and the inner core 4 is cylindrical paper tube.

It should be noted that the thin line melting body 3 remaining on the outer edge after tearing is hard, thin and has rough edges. However, the outer surface of the polyester fiber textile cloth is rough due to the loop layer 2, and the thin line melting body 3 remaining on the outer edge can maintain a large friction force with the outer surface of the polyester fiber textile cloth. Even the thin line melting body 3 remaining on the outer edge can be tied in the loop layer 2 on the outer surface of the polyester fiber textile cloth. Therefore, the thin line melting body 3 remaining on the outer edge can be attached to the outer surface of the polyester fiber textile cloth, so that the roll-type polyester fiber textile cloth can maintain a stable winding shape, and is not easy to fall off and be scattered.

This embodiment also provides processing equipment for preparing the above polyester fiber textile cloth. The processing equipment is ultrasonic equipment, which mainly involves preparing thin line melting bodies 3 at intervals on the long polyester fiber textile cloth.

Figure 6:
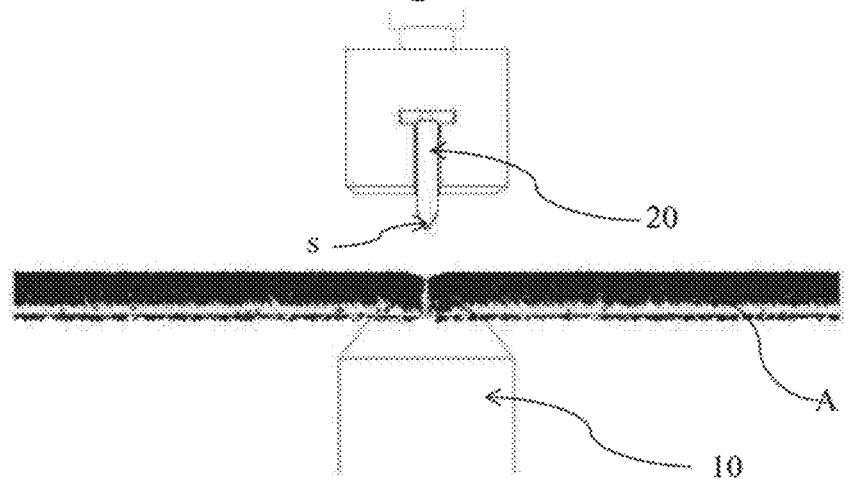
FIG. 6 is a schematic view of the processing of the continuous polyester fiber textile cloth that can be torn into pieces.

As shown in FIG. 6, the processing equipment comprises an ultrasonic welding head 10 and a metal knife mold 20 driven by a driving mechanism. The ultrasonic welding head 10 comprises an ultrasonic emitting device and a welding head. The ultrasonic emitting device converts the 220V alternating current into a high-frequency ultrasonic signal, and then connects to the transducer and converts it into high-frequency vibration to drive the head to generate high-frequency ultrasonic vibration. The welding head has a rest surface on which the polyester fiber textile cloth is carried, and the polyester fiber textile cloth is conveyed on this rest surface.

The metal knife mold 20 comprises a knife edge s extending along the width direction of the textile cloth. Under the action of the driving mechanism, the knife edge s of the metal knife mold 20 moves down to contact the surface of the polyester fiber textile cloth. As a result, the metal knife mold 20 resonates with the ultrasonic head 10 below the polyester fiber textile cloth, and the ultrasonic welding head 10 generates a linear high temperature zone. The width of the linear high temperature zone is the same as the width of the knife edge s. This linear high temperature zone melts the base layer 1 and the loop layers 2 of the polyester fiber textile cloth there. At the same time, the knife edge s and the head squeeze this part of the melt to form a thin line melting body 3. That is, the base layer 1 and the loop layers 2 are heated and melted by high-frequency ultrasonic waves to form a thin line melting bodies 3.

In the same way, the hot-melt cutting edges on both sides of the polyester fiber textile cloth can also be prepared in this way.

Preferably the drive mechanism may be an air cylinder controlled by a pneumatic transmission system. In actual operation, as soon as the power supply starts to trigger the control signal, the control signal makes the pneumatic transmission system run and the cylinder pressurizes to drive the metal knife mold down, and at the same time the control signal makes the ultrasonic emitting device of the ultrasonic welding head 10 emit ultrasonic waves to make the welding head ultrasonically vibrate. The metal knife mold is pressed down and squeezed together with the ultrasonic welding head to squeeze the polyester fiber textile cloth, and the ultrasonic emission is removed after a certain period of time. The pressure of the pneumatic transmission system is decompressed, and the metal knife mold is lifted, thereby preparing a thin line melting body 3. After a certain period of time, the above procedure is continued to complete the preparation of the next thin line melting body 3.

Preferably, the vibration frequency of the ultrasonic welding head 10 is 2000-50000 times/second, the heating temperature of the ultrasonic welding head 10 is 150-400° C., and the duration for the knife edge to press down and contact the polyester fiber textile cloth is 0.02-1 second. It should be noted that the time and pressure of the knife edge s pressing down on the surface of the polyester fiber textile cloth need to be set reasonably, so as to avoid the situation where the polyester fiber textile cloth is fused or the thin line melting bodies 3 are too thick, which make it difficult to tear.

With this processing equipment and processing method, there is no need to preheat the metal knife mold and the ultrasonic welding head during preparation. The heat can be generated by pressing the contact to generate resonance, and the heat can be reduced when the resonance disappears, so as to realize the formation and temperature control of the linear high temperature zone. Therefore, continuous operation can be realized, and the temperature of the cutter head is basically consistent each time, so as to ensure the consistency of each thin line melting body 3.

The polyester fiber textile cloth that can be torn into pieces provided by the present invention has been introduced in detail above. The principles and implementations of the present invention are described herein by using specific examples, and the descriptions of the above embodiments are only used to help understand the present invention and the core idea. It should be pointed out that for those skilled in the art, without departing from the principle of the present invention, several improvements and modifications can also be made to the present invention, and these improvements and modifications also fall within the protection scope of the claims of the present invention.

What is claimed is:

1. A continuous polyester fiber textile cloth that can be torn into pieces, comprising a continuously extending polyester fiber textile cloth, wherein the polyester fiber textile cloth is provided with a plurality of thin line melting bodies at certain intervals along a length direction, and the thin line melting body is configured to span a width of the polyester fiber textile cloth;

the polyester fiber textile cloth comprises a base layer woven from yarn and a loop layer arranged on at least one side of the base layer, and the thin line melting bodies are formed by heating, melting and pressing the base layer and the loop layer, a thickness of the thin line melting bodies is less than or equal to a thickness of the base layer;

wherein by tearing along the thin line melting body, a single piece of textile cloth can be separated from the continuous polyester fiber textile cloth;

wherein the base layer and the loop layer(s) are heated and melted by high-frequency ultrasonic waves;

wherein being heated and melted by high-frequency ultrasonic waves comprises a heating temperature of an ultrasonic welding head being 150-400° C. and a duration for a knife edge to press down and contact the polyester fiber textile cloth being 0.02-1 second.

2. The continuous polyester fiber textile cloth according to claim 1, wherein the thin line melting body is configured to be in a form of a straight line, a curved line, a zigzag line or a bent line.

3. The continuous polyester fiber textile cloth according to claim 1, wherein the thickness of the thin line melting bodies is 0.01-2 mm, and the width of the thin line melting bodies is 1-5 mm.

4. The continuous polyester fiber textile cloth according to claim 1, wherein a width of the single piece of textile cloth is consistent with the width of the polyester fiber textile cloth and a length of the single piece of textile cloth is 5 cm-200 cm.

5. The continuous polyester fiber textile cloth according to claim 1, wherein two sides in a length direction of the polyester fiber textile cloth are heat-melt cutting edges.

6. The continuous polyester fiber textile cloth according to claim 2, wherein two sides of the base layer are respectively provided with loop layers, and the base layer and the two loop layers are heated and melted and pressed to form the thin line melting body.

7. The continuous polyester fiber textile cloth according to claim 1, comprising an inner core, and the polyester fiber textile cloth with the thin line melting bodies is wound on the inner core.

8. The continuous polyester fiber textile cloth according to claim 1, wherein the polyester fiber textile cloth with thin line melting bodies is stacked in a container in a "Z"-shaped continuous folding manner.

9. The continuous polyester fiber textile cloth according to claim 1, wherein the base layer is prepared by a warp knitting process, wherein the base layer comprises loop units composed of woven threads, and the loop units are mutually interwoven to form constraints.

10. The continuous polyester fiber textile cloth according to claim 1, wherein the base layer is prepared by a weft knitting process, and the base layer comprises a semi-loop unit composed of woven threads, and the semi-loop units formed by adjacent woven threads are mutually interwoven.

\* \* \* \* \*